United States Patent

[11] 3,578,986

[72] Inventors August L. McGuffin
Clinton;
Ralph M. Philip, Whitesboro, N.Y.
[21] Appl. No. 754,378
[22] Filed Aug. 21, 1968
[45] Patented May 18, 1971
[73] Assignee General Electric Company

[54] STACKED PULSE-FORMING NETWORK SWITCHING CIRCUIT
8 Claims, 3 Drawing Figs.

[52] U.S. Cl. .......... 307/246, 307/252, 328/67, 331/87, 307/260
[51] Int. Cl. .......... H03k 17/00, H03k 1/00
[50] Field of Search .......... 307/246, 252; 328/67, 232; 331/87

[56] References Cited
UNITED STATES PATENTS

| | | | |
|---|---|---|---|
| 2,837,638 | 6/1958 | Frink | 328/67 |
| 3,051,906 | 8/1962 | Haynes | 328/67 |
| 3,185,928 | 5/1965 | Coyle | 328/67 |
| 3,189,837 | 6/1965 | Grotz | 328/67 |
| 3,267,290 | 8/1966 | Diebold | 307/252 |

*Primary Examiner*—Donald D. Forrer
*Assistant Examiner*—David M. Carter
*Attorneys*—Irving M. Freedman, Melvin M. Goldenberg, Frank L. Neuhauser and Oscar B. Waddell

ABSTRACT: A multiple element switching circuit, including a plurality of controlled unilateral conductive elements such as silicon controlled rectifiers, for connection across a charged pulse-generating circuit and a load in a pulse generator. The switching circuit includes a plurality of SCRs which are each connected in shunt across one of a plurality of serially connected pulse-forming networks. When the SCRs are gated, each pulse-forming network is short circuited. The short-circuited pulse-forming networks provide a step voltage to switch the pulse voltage connected thereacross while providing isolation between each of the conductive elements.

INVENTORS:
AUGUST L. McGUFFIN,
RALPH M. PHILIP,

BY Irving M. Freedman
THEIR ATTORNEY.

Patented May 18, 1971 3,578,986

2 Sheets-Sheet 2

INVENTORS:
AUGUST L. McGUFFIN,
RALPH M. PHILIP,

BY Irving M. Freedman
THEIR ATTORNEY.

STACKED PULSE-FORMING NETWORK SWITCHING CIRCUIT

BACKGROUND OF THE INVENTION

This invention relates to electrical switching circuits. More particularly, it relates to a switching circuit including a plurality of SCRs for switching a high voltage direct current pulse. The invention herein described was made in the course of or under a contract or subcontract thereunder with the Department of the Navy.

In a standard pulse generator, a source of pulse energy, which may for example comprise a charged pulse-forming network, is connected to a load. A switch is connected across the load and pulse-generating circuit, and when the switch is closed, the pulse-generating circuit discharges to supply a pulse to the load. Unilateral controlled switching elements such as silicon controlled rectifiers have been widely used to switch such pulse generators. Very often, the voltage that is produced by the pulse-generating circuit is too large to be switched by a single SCR, and therefore, multiple element switching circuits are used rather than single SCRs. The multiple element switching circuit comprises a plurality of series-connected controlled unilateral conductive elements such as SCRs. The gate of each SCR is connected to a trigger generator which provides gating pulses.

In order to assure proper operation, each of the SCRs must be turned on simultaneously, and the voltage across the SCRs must be equally divided. If the serially connected SCRs do not turn on simultaneously, the SCRs which are conducting may apply a very large voltage to a single nonconducting SCR, which voltage may be sufficient to permanently damage it. Furthermore, if the voltage across the SCRs is not equally divided during the entire switching cycle, an undesirably large voltage may be applied to an individual SCR.

Prior multiple series-connected SCR switching circuits have included those which are simultaneously triggered and those using slave triggered arrangements. In the simultaneously triggered arrangement, the gate of each of a plurality of series-connected SCRs is coupled to a single trigger generator which provides a gating pulse to turn the SCRs on simultaneously. Stray capacitance in the trigger circuit, however, may result in nonuniform trigger pulses so that the SCRs are not actually triggered simultaneously. Even if each SCR is coupled to the trigger generator by an isolated secondary transformer winding, thus reducing stray capacitance in the trigger circuit, the SCRs still might not turn on simultaneously due to differences in SCR turn-on characteristics as well as the remaining stray capacitance. Thus, conductive SCRs may apply a large voltage to nonconductive SCRs during the switching operation. Voltage equalization networks may be connected across each SCR to improve the switching operation. In order to provide for the most effective voltage equalization, the values of the network components should be chosen so that the impedance of each series-connected element is identical at any instant of the switching cycle. The tolerances of values of the voltage equalization network components are small.

In the slave triggered arrangement, a gating pulse triggers a first SCR, which triggers a second SCR, and triggering continues until each of the series-connected SCRs are conductive. As successive SCRs become conductive, an increasing voltage is applied to those SCRs not yet conducting. Shunt capacitors must be connected in the circuit to limit the rate of rise of voltage across the nonconducting SCRs. As the number of series-connected switching elements increases, the values of the shunting capacitors become increasingly critical, so that if the values of the capacitors are not carefully chosen, permanent damage to the SCRs may result.

In both arrangements, there is a possibility of permanent damage to individual switching elements due to the interaction between them, i.e., the application of a voltage by conductive SCRs to nonconductive SCRs.

It is therefore an object of the present invention to provide a multiple element switching circuit for switching large direct current voltages in a pulse generator in which the switching elements are electrically isolated from each other during the switching operation.

It is another object of the present invention to provide a multiple element switching circuit for switching large direct current pulse voltages in which the switched voltage is equally divided across each element.

It is also an object of the present invention to provide an electrical switching circuit of the type described, the operation of which is not affected by differences in turn-on characteristics of the elements or by normal differences in stray capacitance in the gating or triggering circuit.

It is a further object of the present invention to provide a multiple element switching circuit in a direct current pulse generator which is simple in construction and reliable in operation.

SUMMARY OF THE INVENTION

Briefly stated, in accordance with the present invention, there is provided a multiple element switching circuit for switching a high voltage direct current pulse having first and second terminals for connection across a pulse-forming network and a load in a pulse generator. Typically, the switching circuit includes a plurality of series-connected (stacked) pulse-forming networks which are charged by a source. A controlled unilateral conductive element such as an SCR is connected across each stacked pulse-forming network, and the control electrode of each element is coupled to a trigger generator which provides gating pulses. When the elements are gated, each of the pulse-forming networks within the switching circuit is shorted. The shorted networks provide a step voltage between the output terminals so that the voltage which is supplied by the multiple element switching circuit is switched while providing isolation between each of the switching elements.

BRIEF DESCRIPTION OF THE DRAWINGS

The foregoing objects and features of novelty which characterize the invention are pointed out with particularity in the appended claims. The present invention, both as to its organization and manner of operation, as well as its best modes of operation, may be further understood by reference to the following description, taken in connection with the following drawings.

Of the drawings.

DESCRIPTION OF THE PREFERRED EMBODIMENTS

Figure 1:
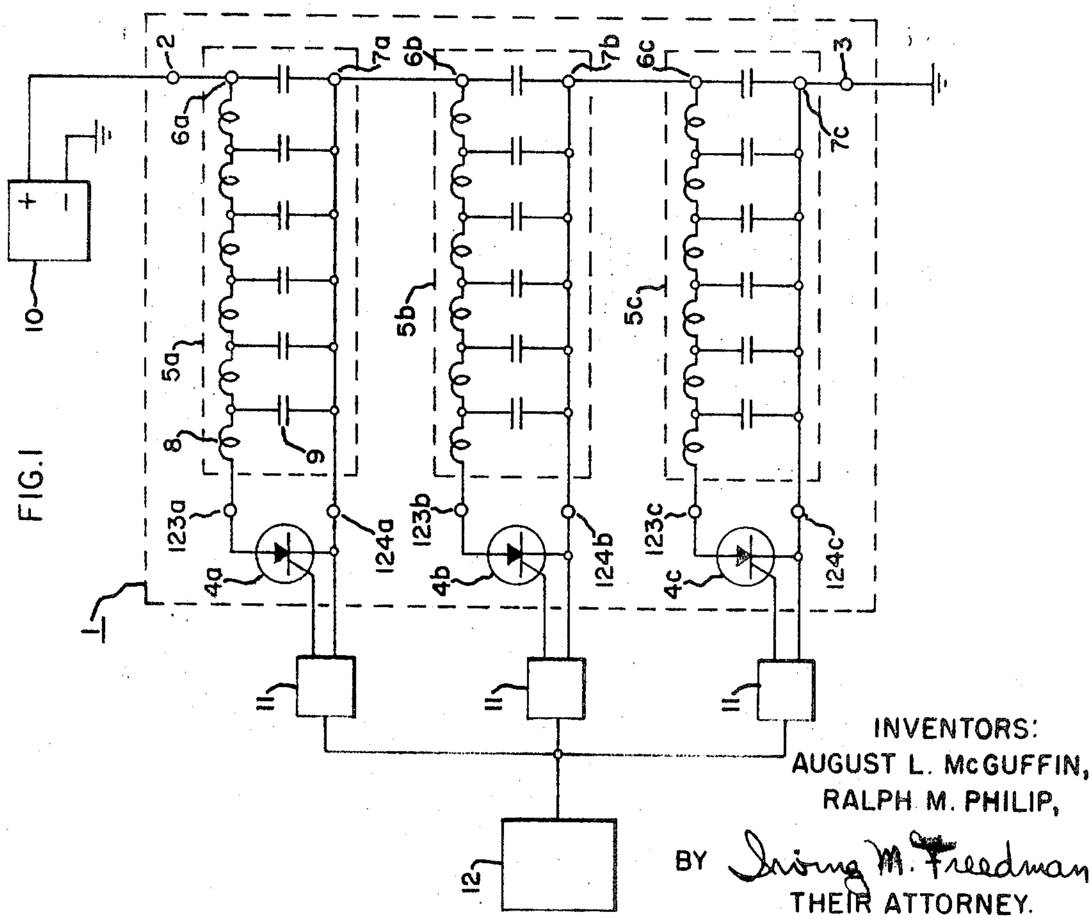
FIG. 1 is a representation in schematic form of a switching circuit constructed in accordance with the present invention.

FIG. 1 illustrates a multiple element switching circuit 1 constructed in accordance with the present invention for switching a high voltage direct current pulse. The switching circuit 1 is provided with a positive terminal 2 and a negative terminal 3 across which the DC supply voltage may be applied. A plurality of similarly poled controlled unilateral conductive elements are utilized to switch the DC pulse.

As seen in FIG. 1, the switching elements may comprise a plurality of SCRs **4*a*, 4*b* and 4*c*. The switching circuit 1 further comprises a plurality of pulse-forming energy-storage networks 5*a*, 5*b* and 5*c* which are connected in series between the terminals 2 and 3. Each network 5 is provided with input terminals 123*a* and 124*a* and output terminals 6*a* and 7*a*. The output terminal 6*a* is connected to the terminal 2, the output terminal 7*a* is connected to the output terminal 6*b*, the output terminal 7*b* is connected to the output terminal 6*c*, and terminal output 7*c* is connected to the terminal 3 in order to connect the networks 5 in series between the terminals 2 and 3. An SCR 4 is connected across each network 5 in order to provide for switching in a manner explained below. The SCR 4***a* is connected across the network 5*a* so that its anode is connected through the terminal 123*a* and the delay line 5 to the terminal 6*a* and its cathode is connected through the input terminal 124*a* and the delay line to the terminal 7*a*. The SRCs 4*b* and 4*c* are similarly connected through the networks 5*b* and 5*c* to the output terminals 6*b* and 7*b* and 6*c* and 7*c*, respectively. It is seen that the SCRs 4*a*, 4*b*, and 4*c* comprise a multiple element switch which is operated to provide a rapid voltage change between the terminals 2 and 3.

Any number of SCRs 4, each connected across a network 5 which is in turn connected in series between the terminals 2 and 3, may be provided. The switching circuit 1, however, is particularly suited for use where the magnitude of voltage which is applied across the terminals 2 and 3 is such that more switched. A step voltage is effectively in series with the external circuit connected across terminals 2 and 3 so that a step current conduction occurs thereacross. The voltage which is applied across the terminals 2 and 3 is thus switched whenever appropriate characteristic impedance is provided in the external circuit.

Figure 2:
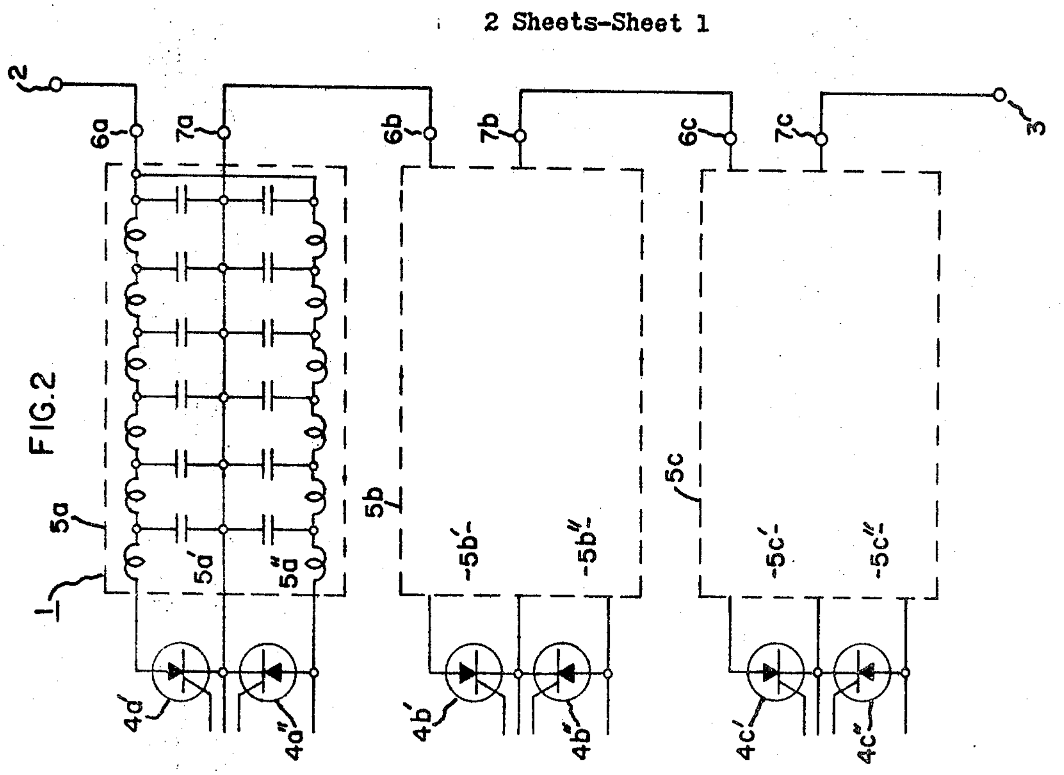
FIG. 2 is a schematic representation of a second embodiment of the present invention.

Since the networks 5 include both capacitive and inductive components 8 and 9, the networks 5 act as delay lines as well as energy storage networks. When the SCR 4*a* is gated, the capacitors 9 included in the network 5*a* discharge therethrough. The change in the potential appearing across the SCR 4*a* to the SCR 4*b* is delayed by the networks 5*a* and 5*b*. Similarly, the change in the potential appearing across the SCR 4*b*, as the capacitors 9 included in the energy storage network 5*b* discharge therethrough, is delayed by the networks 5*b* correspond to those shown in FIG. 1. In this circuit, as in the circuit shown in FIG. 1, a plurality of pulse-forming energy-storage networks *5a*, *5b* and *5c* are connected in series between the terminals 2 and 3 by means of terminal *6a* and *7a*, *6b* and *7b*, and *6c* and *7c*, respectively. The networks 5 are arranged to each be charged to the same voltage as the networks 5 shown in FIG. 1. However, provision is made for doubling current-carrying capacity as determined by SCR characteristics, of each ladder of network 5. This is achieved by constructing each network 5 of parallel-connected delay networks 5′ and 5″. As seen in FIG. 2, the network *5a* consists of parallel-connected delay networks *5a*′ and *5a*″, network *5b* consists of parallel-connected delay networks *5b*′ and *5b*″, while the network *5c* consists of the parallel-connected delay networks *5c*′ and *5c*″. Since the networks 5′ and 5″ are connected in parallel, each network 5 is charged to the same voltage as it would be if it included a single delay network. In addition, when the networks 5′ and 5″ are short circuited by means of an SCR 4, the same voltage appears between the terminals 6 and 7 of each network 5 that would appear if one delay network were connected thereacross.

In order to initiate the switching operation, provision is made for short circuiting each delay network 5′ and 5″ included within each energy storage network 5. This is achieved by connecting an SCR 4 across each delay network. For this reason, SCR *4a*′ is connected across delay network *5a*′ within the network *5a* and SCR *4a*″ is connected across delay network *5a*″ which is also included within the network *5a*. Similarly, SCR *4b*′ is connected in shunt across delay network *5b*′ and SCR *4b*″ is connected across delay network *5b*″ within the network *5b*, while the SCRs *4c*′ and *4c*″ are connected across delay networks *5c*′ and *5c*″, respectively, within the network *5c*.

As in the circuit shown in FIG. 1, gating pulses are provided to the SCRs 4 to initiate the switching operation. Within each network 5, it is seen that the SCRs 4′ and 4″ are connected across parallel-connected delay networks 5′ and 5″.

Once again, each network 5 acts as a delay line as well as an energy-storage network so that during the switching operation, each pair of SCRs 4′ and 4″ is isolated from the next so that no interaction therebetween occurs. Thus, the entire potential appearing between the terminals 2 and 3 may be switched, while at no time during the switching operation is the voltage applied to each pair of SCRs 4′ and 4″ greater than that appearing across each pair of terminals 6 and 7. In this manner, the possibility of damage to the SCRs 4 which may occur due to their nonsimultaneous turn-on is again eliminated.

Figure 3:
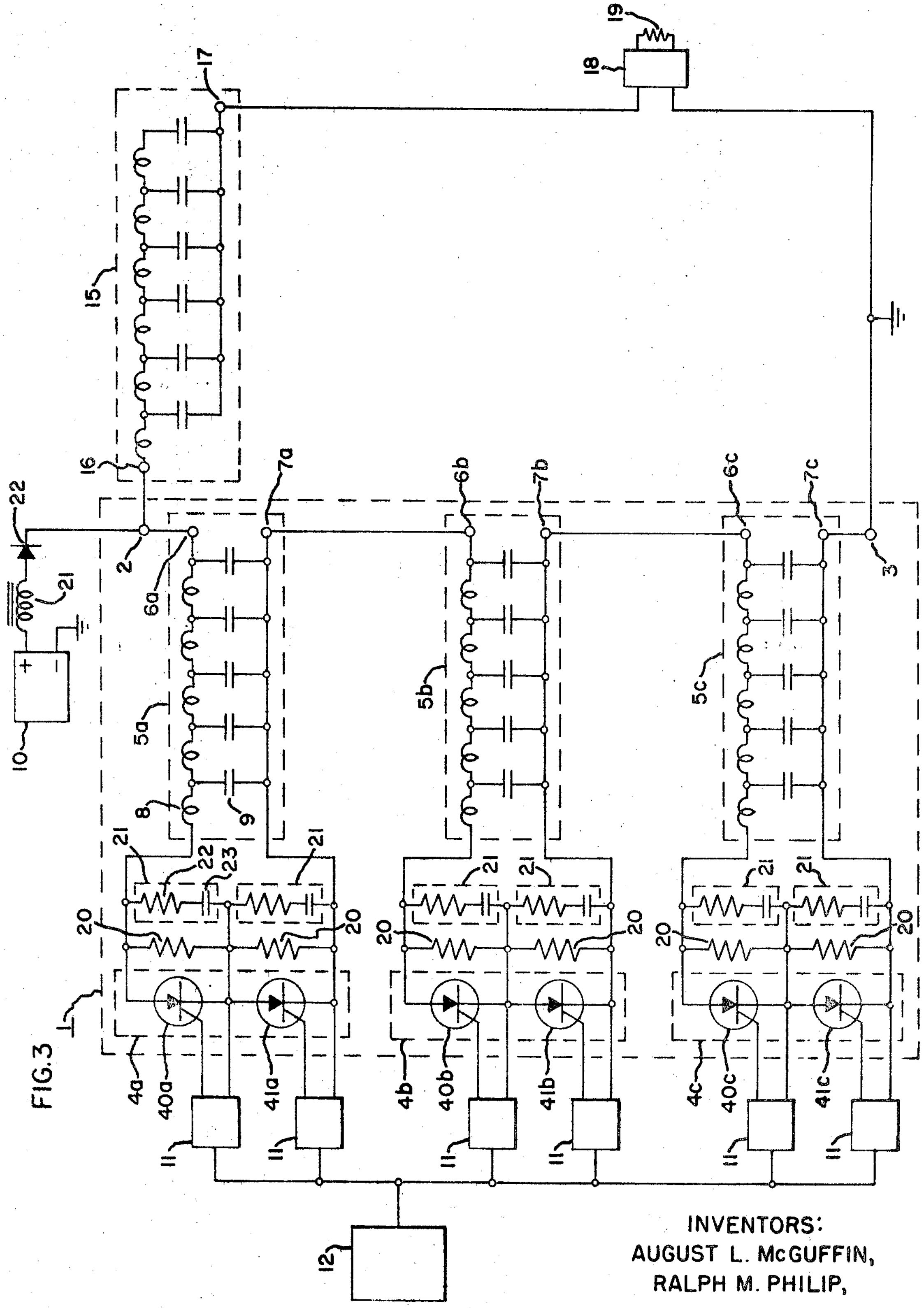
FIG. 3 is a schematic representation of a further embodiment of the present invention connected in a pulse generator.

FIG. 3 illustrates another form of the switching circuit 1 connected by means of the terminals 2 and 3 in a pulse generator in which it is particularly suited for applications where size and weight should be minimized. The organization and operation of a switching circuit 1 is similar to that shown in FIG. 1, and therefore, the same reference numerals are used to denote elements corresponding to those in FIG. 1. In this circuit, the values of the inductors 8 and capacitors 9 included within each network 5 are chosen so that each network 5 is charged to twice the voltage as the network in FIG. 1. Thus, the switching circuit 1 is capable of switching twice as large a potential which may be applied across the terminals 2 and 3 as that shown in FIG. 1. For this reason, each switching element *4a*, *4b*, and *4c*, connected across the networks *5a*, *5b*, and *5c*, respectively, comprises first and second series-connected SCRs 40 and 41. As explained above, when no more than two SCRs are connected in series, the threat of damage due to interaction between the SCRs is not significant.

Pulse-forming network 15 is charged to the same initial voltage as applied across the terminals 2 and 3. The pulse-forming network 15 may be provided with terminals 16 and 17 for connection in the pulse-generator circuit. As seen in FIG. 3, the terminal 16 of the pulse-forming network circuit 15 is connected to the terminal 2 of the switching circuit 1, while the terminal 17 is connected to a load 18, which may for example comprise a pulse transformer winding coupled to a pulse utilization means 19. The load 18 is connected in series between the terminal 17 and the terminal 3 of the switching circuit 1.

The charged pulse-forming network 15 preferably comprises capacitive energy storage means and may, for example, as shown in FIG. 3, comprise an L-C ladder network. The pulse-forming network 15 is connected for charging to the source 10 by the terminals 16 and 2. A DC resonant charging choke 21 may be connected in series between the source 10 and terminal 2 so that the networks 5 and pulse-forming network 15 are charged to twice the potential of the source 10. In addition, a diode 22 is connected in series between the source 10 and terminal 2 for blocking between the terminal 2 and the source 10 as the networks 5 and pulse-forming network 15 discharge in a manner to be described below.

Since terminal 16 of the pulse-forming network 15 is connected to the terminal 2 and the terminal 17 is coupled to the terminal 3 of the pulse-generating circuit 1, the potential to which the pulse-forming network circuit 15 is charged is also applied across the terminals 2 and 3 of the switching circuit 1. Likewise, it is seen that the switching circuit 1 is connected across the terminal 16 of pulse-forming network circuit 15 to ground. After SCRs 4 are gated by trigger generators 11, the voltage between each pair of terminals 6 and 7 tends to reverse. These voltages add to the charged voltage of pulse-forming network 15. A plurality of potentials are thus applied in series to the load 18. Current flows from the terminal 17 to the terminal 16, through terminal 2, terminals *6a* and *7a*, terminals *6b* and terminal *7b*, terminals *6c* and terminal *7c*, through the terminal 3 through the load 18 and to the terminal 17. Thus, a pulse of voltage whose magnitude is dependent upon the impedances of the pulse-generating circuits is supplied to the load 18. Once the discharge of the pulse-forming networks 5 and 15 is complete, reflected voltages from the load 18 provide a voltage of opposite polarity to the terminal 3. This reverse voltage appears between terminals *6a* and *7a*, *6b* and *7b*, *6c* and *7c* and is coupled to the SCRs *4a*, *4b*, *4c*, respectively. This potential is coupled to the cathode of each SCR 4 and provides a positive signal to turn each SCR off.

Examining the switching circuit 1 more closely, it is seen that each of the switching elements *4a*, *4b*, or *4c* comprises first and second series-connected SCRs 40 and 41. Thus, the SCRs *40a* and *41a* are connected in series, and the anode of the SCRs *40a* is coupled to the terminal *6a*, while the cathode of the SCR *41a* is coupled to the terminal *7a*. The SCRs *40b* and *41b* and the SCRs *40c* and *41c* are similarly connected between the terminals *6b* and *7b* and the terminals *6c* and *7c*, respectively. Once again there is no danger of damage to either switching element 40 or 41 since only two SCRs 40 and 41 are connected in series between each pair of terminals 6 and 7. Within each switching element 4, a resistor 20 may be connected across each SCR 40 and across each SCR 41 to assure a proper voltage drop across the SCRs 40 and 41. Also, a smoothing circuit 21 comprising a series-connected resistor 22 and capacitor 23 may be connected across each SCR 40 and another smoothing circuit 21 connected across each SCR 41 in order to limit the rate of voltage rise thereacross. However, no additional circuitry is necessary to equalize the voltages across the switching elements *4a*, *4b*, and *4c*.

Once again, as in the circuit in FIG. 1, each network 5 acts as a delay line so that each switching element 4 comprising the series-connected SCRs 40 and 41 is isolated from the next during the switching operation so that no interaction between the switching elements can occur. Thus, while the entire potential to which the pulse-forming network 15 and switching circuit 1 are charged may be applied across the terminals 2 and 3, at no time is a voltage applied across each series-connected pair of SCRs 40 and 41 which is greater than the voltage across the terminals 6 and 7 to which it is coupled. In this manner the great possibility of damage to individual switching elements that exist in a circuit including a plurality, especially more than two, of series-connected SCRs is eliminated.

What is claimed as new and desired to be secured by Letters Patent of the United States is:

We claim:

1. An electrical switching circuit for connection across a charged pulse-generating circuit and a load in a pulse generator, said pulse generator including a direct current charging source connected to said pulse-generating circuit and a trigger generator, comprising in combination:

a. a plurality of serially connected pulse-forming energy-storage networks having a series discharge path;

b. means connecting said pulse-forming energy-storage networks to said source for charging therefrom; and c. a plurality of controlled unilateral conductive elements connected to said trigger generator so as to be gated thereby, one controlled unilateral conductive element connected in shunt across each of said pulse-forming energy-storage networks and connected such that each of said unilateral conductive elements is isolated from the series discharge path by one of said pulse-forming energy-storage networks during a switching operation.

2. A switching circuit as defined in claim 1 in which each of said pulse-forming energy-storage networks comprises a delay network, consisting of the same number of series-connected inductors and parallel-connected capacitors.

3. A switching circuit as defined in claim 2 in which each of said capacitors comprising said pulse-forming energy-storage networks are of equal value, and in which each of said inductors included in each of said pulse-forming energy-storage networks are of equal value.

4. An electrical switching circuit as defined in claim 3 in which each of said controlled unilateral conductive elements comprises a silicon controlled rectifier.

5. A switching circuit as defined in claim 3 in which each of said controlled unilateral conductive elements comprises first and second series-connected silicon controlled rectifiers.

6. An electrical switching circuit for connection across a charged pulse-generating circuit and a load in a pulse generator, said pulse generator further comprising a direct current charging source connected to said pulse-generating circuit and a trigger generator, comprising in combination:

a. a plurality of serially connected pulse-forming energy-storage networks having a series discharge path, each pulse-forming energy-storage network comprising first and second parallel-connected delay networks:

b. means for connecting said pulse-forming energy-storage networks to said source for charging therefrom; and c. a plurality of controlled unilateral conductive elements connected to said trigger generator so as to be gated thereby, one unilateral controlled conductive element connected in shunt across each of said delay networks and connected such that each of said unilateral conductive elements is isolated from the series discharge path by one of said pulse-forming energy-storage networks during a switching operation.

7. A switching circuit as defined in claim 6 in which each of said controlled unilateral conductive elements comprises a silicon controlled rectifier.

8. A switching circuit as defined in claim 7 in which each delay network comprises an equal number of inductors and capacitors, each of said inductors are of equal value, and each of said capacitors are of equal value.